US012064655B2

(12) United States Patent
Hut et al.

(10) Patent No.: US 12,064,655 B2
(45) Date of Patent: Aug. 20, 2024

(54) EXTINGUISHING SYSTEM AND METHOD FOR EXTINGUISHING FIRES

(71) Applicant: HYTRANS BEHEER B.V., Lemmer (NL)

(72) Inventors: Robert Dirk Hut, Lemmer (NL); Appie Veenema, Lemmer (NL)

(73) Assignee: HYTRANS BEHEER B.V., Lemmer (NL)

( * ) Notice: Subject to any disclaimer, the term of this patent is extended or adjusted under 35 U.S.C. 154(b) by 211 days.

(21) Appl. No.: 16/972,144

(22) PCT Filed: Jul. 19, 2019

(86) PCT No.: PCT/NL2019/050467
§ 371 (c)(1),
(2) Date: Dec. 4, 2020

(87) PCT Pub. No.: WO2020/017973
PCT Pub. Date: Jan. 23, 2020

(65) Prior Publication Data

US 2021/0236865 A1 Aug. 5, 2021

(30) Foreign Application Priority Data

Jul. 20, 2018 (NL) ...................................... 2021363

(51) Int. Cl.
*A62C 37/36* (2006.01)
*A62C 3/02* (2006.01)
(Continued)

(52) U.S. Cl.
CPC .......... *A62C 3/0292* (2013.01); *A62C 31/005* (2013.01); *A62C 37/36* (2013.01); *A62C 3/0214* (2013.01); *A62C 27/00* (2013.01)

(58) Field of Classification Search
CPC ..... A62C 25/00; A62C 231/05; A62C 237/08; A62C 237/00; A62C 237/40; A62C 37/36; A62C 3/0292; A62C 31/005
(Continued)

(56) References Cited

U.S. PATENT DOCUMENTS 4,189,005 A * 2/1980 McLoughlin .......... A62C 27/00 700/282
5,134,961 A * 8/1992 Giles .................... G05D 7/0688 239/71
(Continued)

FOREIGN PATENT DOCUMENTS

CN 1387452 A 12/2002
WO 2006052792 A2 5/2006

OTHER PUBLICATIONS

International Search Report and Written Opinion for the International Patent Application No. PCT/NL2019/050467, mailed Nov. 21, 2019, 12 pages.

*Primary Examiner* — Chee-Chong Lee
(74) *Attorney, Agent, or Firm* — KDW Firm PLLC

(57) ABSTRACT

An extinguishing system and method for extinguishing fires. The extinguishing system includes-a pump system for pumping extinguishing agent; one or more nozzles connected operatively to the pump system for the purpose of spraying extinguishing agent at a source of fire; a supply or inlet arranged on the pump system for the purpose of supplying extinguishing agent to the pump system; an extinguishing conduit with an extinguishing length arranged on the pump system for the purpose of supplying extinguishing agent to the at least one nozzle; and an extinguishing controller provided with an input system for inputting system data, including data about the extinguishing conduit, the pump system and the at least one nozzle. The extinguishing controller is configured to determine with the
(Continued)

system data an operating pressure at or close to the at least one nozzle and thereby control the pump system.

20 Claims, 1 Drawing Sheet

(51) Int. Cl.
*A62C 31/00* (2006.01)
*A62C 27/00* (2006.01)

(58) Field of Classification Search
USPC ............................................................ 169/47
See application file for complete search history.

(56) References Cited

U.S. PATENT DOCUMENTS

| | | | | | |
|---|---|---|---|---|---|
| 5,727,634 | A * | 3/1998 | Ishida | A62C 31/05 169/61 |
| 6,079,502 | A * | 6/2000 | Davis | A62C 37/40 169/61 |
| 6,651,900 | B1 * | 11/2003 | Yoshida | A62C 25/00 417/18 |
| 6,857,478 | B1 * | 2/2005 | Weber | A62C 35/60 169/52 |
| 2005/0056435 | A1 * | 3/2005 | Price | A62C 27/00 239/587.1 |
| 2006/0131038 | A1 * | 6/2006 | Lichtig | A62C 25/005 169/52 |
| 2006/0180321 | A1 | 8/2006 | Yoshida | |
| 2007/0022994 | A1 * | 2/2007 | Moskun | A62C 25/00 123/179.2 |
| 2012/0061108 | A1 * | 3/2012 | Cerrano | G08B 5/38 169/46 |
| 2013/0105010 | A1 | 5/2013 | McLoughlin | |
| 2014/0131600 | A1 * | 5/2014 | McLoughlin | A62C 37/40 251/129.01 |
| 2019/0168033 | A1 * | 6/2019 | Conboy | A62C 27/00 |

* cited by examiner

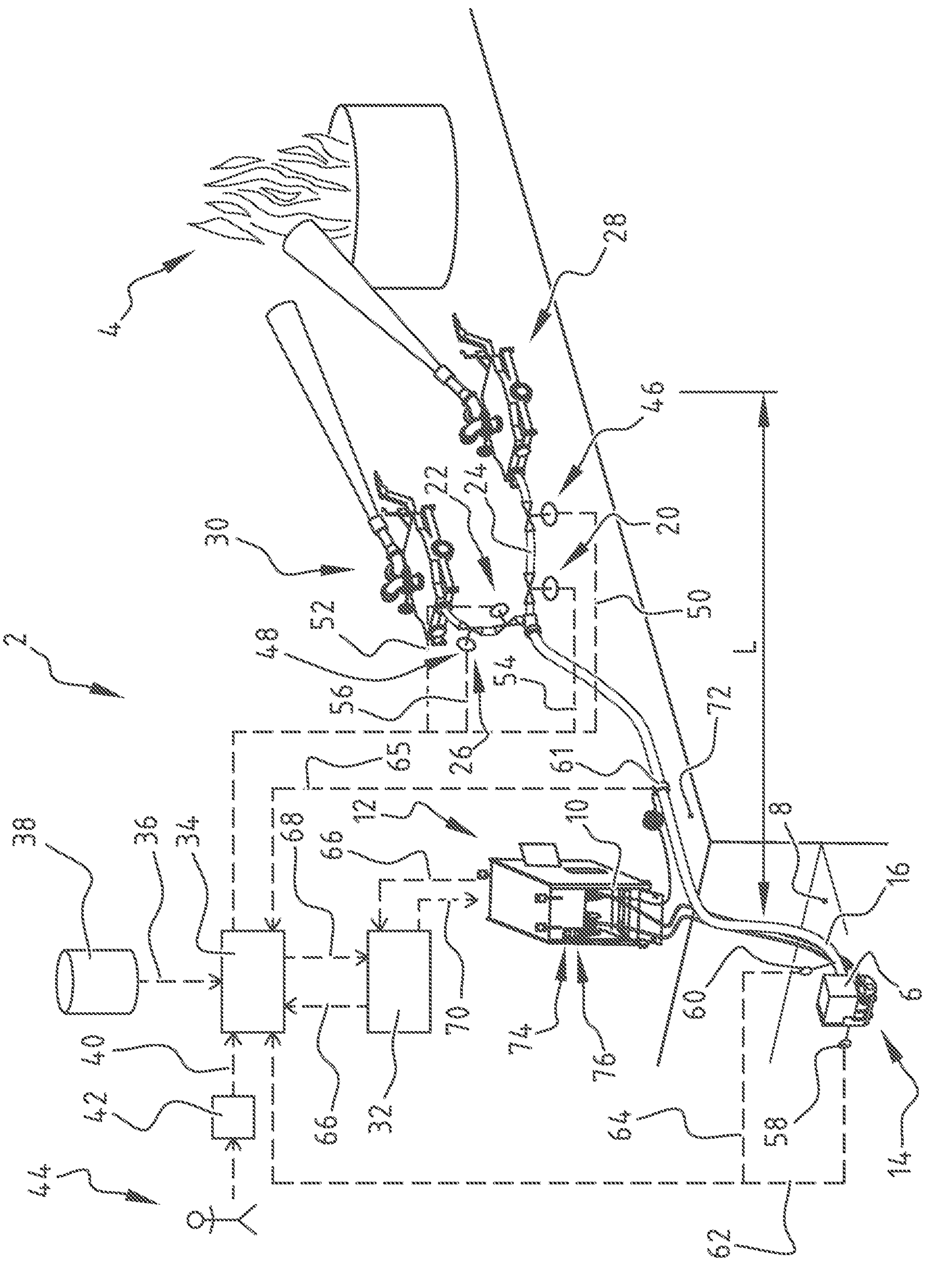
2
4
6
8
10
12
14
16
20
22
24
26
28
30
32
34
36
38
40
42
44
46
48
50
52
54
56
58
60
61
62
64
65
66
68
70
72
74
76
L

EXTINGUISHING SYSTEM AND METHOD FOR EXTINGUISHING FIRES

This is a national stage application filed under 35 U.S.C. § 371 of pending international application PCT/NL2019/050467, filed Jul. 19, 2019, which claims priority to Netherlands Patent Application No. 2021363, filed Jul. 20, 2018, the entirety of which applications are hereby incorporated by reference herein.

The present invention relates to an extinguishing system for extinguishing sources of fire. Such sources of fire are for instance fires in industrial compounds, buildings and nature areas.

Extinguishing systems known in practice make use of a pump system comprising a drive and a so-called booster pump or submersible pump. Water for extinguishing is supplied from a waterway or fire hydrant and carried with the pump system to at least one nozzle with which the source of fire is combatted.

A problem with such extinguishing systems is the variation in pressure and flow which occurs in practice. This occurs for instance if one of the nozzles which is connected to a pump system is turned off. Such variations have a disruptive effect on the nozzle or nozzles which is or are still active. The source of fire is hereby combatted less effectively.

It is thus for instance known in practice that, in an extinguishing system provided with one kilometre of extinguishing conduit and two deluge guns as nozzles, the operating pressure increases from 5 to 8 bar when one of the nozzles is turned off. This is caused by the operation of the pump and by a reduction of the hydraulic losses in the extinguishing conduit.

In conventional extinguishing systems it is possible to provide the pump with a pressure sensor, for instance in the form of a pressure probe fitting, for measuring the current pressure and thereby controlling or at least correcting the pump system. Such a conventional extinguishing system depends here on the operation of such a sensor. The extinguishing system is applied in mostly mobile applications, at locations which are difficult to access and under difficult conditions. This usually makes handling and/or arranging of such sensors awkward. Problems can further occur due to failure or otherwise malfunctioning of such a sensor, whereby the extinguishing system as a whole no longer functions as desired.

The present invention has for its object to provide an improved extinguishing system for extinguishing fires, whereby the above stated drawbacks are obviated or at least reduced, such that a source of fire can be combatted effectively.

This object is achieved with the extinguishing system for extinguishing fires according to the invention, the extinguishing system comprising:

- a pump system for pumping extinguishing agent;
- one or more nozzles connected operatively to the pump system for the purpose of spraying extinguishing agent at a source of fire;
- a supply or inlet arranged on the pump system for the purpose of supplying extinguishing agent to the pump system;
- an extinguishing conduit with an extinguishing length arranged on the pump system for the purpose of supplying extinguishing agent to the at least one nozzle;

- an extinguishing controller provided with an input system for inputting system data, including data about the extinguishing conduit, the pump system and the at least one nozzle,
- wherein the extinguishing controller is configured to determine with the system data an operating pressure at or close to the at least one nozzle and thereby control the pump system.

The extinguishing agent is in particular water for extinguishing, optionally also provided with additives. A nozzle can be formed by different spraying systems, including a hose, gun and the like. As supply, use is usually made of a flexible firehose which is connected to a waterways such as a ditch, canal, lake or river, or to a suitable fire hydrant or other water connection. The pump system is provided with a drive with a motor and a pump. The drive can be provided with energy and various ways. In one of the currently preferred embodiments the energy supply is realized using a so-called diesel hydraulic power pack. It will be apparent that other drives are also possible. The pump can comprise a so-called booster pump, as well as a submersible pump or other suitable pump. The extinguishing system according to the invention is preferably displaceable, for instance using a truck, and can thereby be utilized flexibly at a source of fire.

The extinguishing system according to the invention preferably has a capacity in the range of 1000 l/min to 25000 l/min over distances of 100 m to more than 10 km. Additives are optionally supplied using a foam mixing system.

By providing an extinguishing controller the pump system can be controlled in effective manner. The extinguishing controller makes use here of system data, including data about type, dimensioning and length of extinguishing conduits, data about the pump system, including pump characteristics, data of for instance the hydraulic drive system, and information about the number and type of nozzles provided in the extinguishing system.

According to the invention, the extinguishing controller determines on the basis of the data obtained with the input system the operating pressure at or close to the at least one nozzle, i.e. at the exit of the extinguishing system, and thereby controls the pump system. It is here possible to foresee occurring disturbances in timely manner, and the control can be adjusted before effects of such disturbances actually become manifest in the performance of the extinguishing system according to the invention. Such disturbances occur for instance due to the connecting or shutting off of one of the nozzles. It is further possible to take into account for instance the length of the extinguishing conduits by determining occurring hydraulic losses in these conduits during use. A reliable extinguishing system, which can function autonomously and, during use, independently, is hereby obtained.

According to the invention, the extinguishing controller preferably functions as a type of feedforward controller by determining the operating pressure at the exit of the extinguishing system, at the nozzle or nozzles, herein taking into account occurring disturbances. The extinguishing controller is for this purpose preferably provided with a feedforward component. As stated above, it is thereby possible to foresee such disturbances in timely manner, and the control can be adjusted before effects of such disturbances actually become manifest in the performance of the extinguishing system according to the invention.

The input system can make use of data which are supplied by a user via an input or screen. Such a screen can be fixedly connected to the extinguishing system or provided separately thereof. It is also possible for the user to enter this via an application on for instance a mobile phone or tablet. This enables a flexible input which can be amended by a user in effective manner. Additionally or alternatively, the input system can make use of data from a database, for instance in respect of data about extinguishing conduits and nozzles. Such data are in this way readily available for the extinguishing system according to the invention. It is also possible here to update this database when for instance other types of extinguishing conduits or nozzles become available. Pump characteristics and the like can here also be read by the extinguishing controller.

Data about extinguishing conduits for instance relate to the number of extinguishing conduits, the length and/or diameter of the extinguishing conduits, application of rigid or flexible extinguishing conduits.

Because the extinguishing controller is able to determine on the basis of the system data a current operating pressure at or close to the at least one nozzle, and thereby at the exit of the extinguishing system, the pump system can be controlled in effective manner, also when disturbances occur and/or or taking into account variable data such as those type, hose length and number of nozzles. It is hereby possible in simple and effective manner to factor in a specific situation in the settings of the extinguishing system. A source of fire can hereby be combatted in effective manner without time loss. An extinguishing system can hereby be utilized in a shorter period of time for combatting a source of fire in the most effective manner.

In addition, the extinguishing system according to the invention is not wholly dependent on the operation of sensors or meters, including pressure sensors and flow meters. Such sensors and meters usually require cabling which can be dangerous to persons during extinguishing of a source of fire. Such sensors and meters are further prone to malfunction in the often difficult and sometimes even dangerous situations in which the extinguishing system is utilized. There may additionally also be a problem in respect of freezing of such sensors and meters, whereby they do not function properly. Such problems are avoided with the extinguishing system according to the invention, while an effective operation can be realized by the extinguishing controller by the determination of the current pressure at the exit.

The extinguishing controller can further be provided with a nozzle control whereby nozzles can be turned on and/or off. This can for instance be realized by controlling the valves. This is optionally possible by making use of the mobile application for a user. A user can here for instance control the extinguishing system, for instance the number of active nozzles and optional further settings of the extinguishing system, using the application.

In an advantageous preferred embodiment according to the invention the extinguishing controller can further be utilized to determine the output of the extinguishing system.

The output of the extinguishing system is for instance defined as the quantity of flowing extinguishing agent, particularly the flow of water for extinguishing. Further information about the performance of the extinguishing system is hereby obtained and, if desired, the extinguishing system can hereby be controlled. The extinguishing controller is preferably suitable for determining the output per individual nozzle. This makes it possible to combat the source of fire still more accurately.

In an advantageous embodiment according to the invention the extinguishing system further comprises a pressure sensor or flow meter at or close to the pump system, configured to measure an operating pressure and/or flow at the exit of the pump system.

The sensor or meter provides information to the extinguishing controller, which can here function as control of whether the determination of the extinguishing controller is correct. In addition, the accuracy of the determined operating pressure at or close to the at least one nozzle can hereby be improved. In the case of existing extinguishing systems which are already provided with for instance a pressure sensor in the form of a pressure probe fitting, the extinguishing controller according to the invention can be utilized as a safety check in effective manner. With the extinguishing system according to the invention the safety is hereby also improved in already existing extinguishing systems.

In a further advantageous embodiment according to the invention the extinguishing system comprises a pressure sensor and/or flow meter at or close to one of the at least one nozzle for the purpose of measuring an operating pressure and/or flow at or close to the nozzle.

Additional information about the currently occurring pressures and flows on the exit side of the extinguishing system, i.e. at the location of the actual combatting of the source of fire, is hereby obtained. It is optionally possible to apply a combination of sensors at or close to the pump system and at or close to the nozzle. The accuracy of the extinguishing system can be increased still further hereby. Applying a pressure sensor at or close to the nozzle makes it possible to combine a feedforward extinguishing control with a feedback component.

The sensors and meters are preferably operatively connected to the extinguishing controller, and the extinguishing controller is preferably configured to update the control of the pump system on the basis of the obtained measurement data. Possibly unforeseen disturbances are hereby still detected, whereby the extinguishing system can remain operational effectively and safely.

In a currently preferred embodiment the extinguishing controller is configured to at least partially compensate for dynamic effects of the at least one extinguishing conduit. Such dynamic effects occur particularly when use is made of flexible extinguishing conduits which can move and can influence for instance the pressure, among other things. By taking such effects into account the extinguishing controller can for instance determine a better operating pressure, such that an (even) better operation of the extinguishing system according to the invention is thereby obtained.

The pump system is preferably suitable for carrying extinguishing agent to a plurality of nozzles. In a currently preferred embodiment the extinguishing system is provided with at least two nozzles. By providing the extinguishing system with a plurality of nozzles a source of fire can be combatted effectively. By then applying the extinguishing controller according to the invention it is possible to take specific conditions into account, whereby the extinguishing system can be provided with a flexible number of nozzles depending on the situation in which it may be utilized. An effective and efficient extinguishing system is hereby obtained.

The extinguishing system according to the invention is preferably provided with operating means configured to increase or reduce the operating pressure. The operating means are for instance formed by an increase button and a decrease button with which a user can operate the pump system quickly and effectively, also in the usually difficult conditions in which the extinguishing system is utilized in practice, and can for instance increase or reduce the operating pressure. Said buttons can be provided as physical buttons on or close to the pump system and/or as virtual buttons on a touchscreen, mobile application and the like.

The invention further relates to a method for extinguishing fires, the method comprising the steps of:

- providing an extinguishing system in an embodiment according to the present invention;
- installing the extinguishing system;
- activating the extinguishing system, comprising of supplying system data to the input system, including data about the extinguishing conduit, pump system and the at least one nozzle;
- determining the operating pressure at or close to the at least one nozzle with the extinguishing controller, and thereby controlling the pump system.

Such a method provides the same effects and advantages as described for the extinguishing system.

The method preferably provides for the correcting of the control of the pump system when one of the at least one nozzle is shut off or adjusted. It is optionally possible to further correct the control on the basis of measurements performed by one or more sensors and/or meters. The accuracy of the extinguishing operation can hereby be further improved.

Further advantages, features and details of the invention are elucidated on the basis of a preferred embodiment thereof, wherein reference is made to the accompanying drawing, in which:

FIG. 1 shows a view of an extinguishing system according to the invention.

Extinguishing system 2 is utilized to combat fire source 4 (FIG. 1). Extinguishing system 2 is here provided with pump 6, which during use is arranged in waterway 8 and is driven using drive system 10 with power pack 12. Pump 6 is provided with inlet 14 for supplying water from waterway 8. Pump 6 is further provided with extinguishing conduit 16 which in the shown embodiment is split via manifold 18, optionally provided with valves 20, 22, into extinguishing conduits 24, 26 to first nozzle 28 and second nozzle 30.

Extinguishing system 2 is further provided with a controller 32 for directly or indirectly controlling pump 6. In the shown embodiment controller 32 is operatively connected to extinguishing controller 34. Controller 32 is optionally integrated with extinguishing controller 34. Extinguishing controller 34 can receive information via the input 36 into database 38 and/or input 40 via input device 42 of user 44. In the shown embodiment input device 42 is a mobile application.

In the shown embodiment extinguishing system 2 is provided with two (optional) sensors 46, 48 with which information can be received via measuring signals 50, 52 by extinguishing controller 34. Measuring signals 54, 56 are also optionally provided for the purpose of transmitting valve positions and/or valve controls of valves 20, 22 from and to extinguishing controller 34. If desired, additional sensors 58, 60 which provide information via measuring signals 62, 64 to extinguishing controller 34 can be provided close to pump 6 on the input side and output side. As addition or alternative to sensor 60, pressure probe fitting 61 can be provided for a pressure measurement, for instance a control and/or additional input data via measuring signal 65 to extinguishing controller 34. Sensors 46, 48, 58, 60, 61 can be diverse types of sensor, for instance suitable for measuring pressure and/or flow. Pump data 66 can likewise be provided to extinguishing controller 34. On the basis of the obtained and/or already available information extinguishing controller 34 can send settings or control commands 68 to controller 32, and optionally send them via control signal 70 to pump 6.

In the case of source of fire 4 extinguishing system 2 is carried to the desired position. Pump 6 is placed close to a waterway 8. Powerpack 12 with drive 10 is placed on ground surface 72. User 44 provides information 40 to extinguishing controller 34 via input 42, for instance in the form of a mobile application. Extinguishing controller 34 can here likewise make use of information 36 coming from database 38. On the basis hereof extinguishing controller 34 makes in combination with information of pump data 66 and the specific situation in respect of a number of nozzles 28, 30, as well as extinguishing length L, a determination of the operating pressure on the side of nozzles 20, 30. The effect of extinguishing system 2 on source of fire 4 can hereby already be determined beforehand in effective manner and, if desired, be set using control signal 68, 70.

Possible changes in the situation can be obtained by an update of pump data 66, user data 40 and data coming from measuring signals 50, 52, 54, 56, 62, 64, 65. If desired, it is also possible to have user 44 adjust the current setting of for instance operating pressure for pump 6 via operating buttons 74, 76. An effective and efficient extinguishing system 32 is hereby utilized for the purpose of combatting source of fire 4. When the combatting of source of fire 4 has finished, user 44 can deactivate extinguishing system 2 by means of operating buttons 74, 76 and/or input system 42, after which extinguishing system 2 can be cleared away and be put in storage and/or utilized at a different location.

The present invention is by no means limited to the above described preferred embodiments thereof. The rights sought are defined by the following claims, within the scope of which many modifications can be envisaged.

The invention claimed is:

1. An extinguishing system for extinguishing fires, the extinguishing system comprising:

- a pump system for pumping an extinguishing agent;
- one or more nozzles connected operatively to the pump system for spraying the extinguishing agent at a source of fire;
- a supply or inlet arranged on the pump system for supplying the extinguishing agent to the pump system;
- one or more extinguishing conduits with an extinguishing length arranged on the pump system for supplying the extinguishing agent to the one or more nozzles; and
- an extinguishing controller provided with an input system that receives system data supplied by a user, wherein the system data comprises data about the one or more extinguishing conduits, data about the pump system, and data about the one or more nozzles, the data about the one or more extinguishing conduits comprising:
  - a quantity of the one or more extinguishing conduits; and
  - length and/or diameter of each of the one or more extinguishing conduits;
- wherein the extinguishing controller comprises a feedforward component configured to determine an operating pressure at the one or more nozzles based on the system data obtained by the input system to control the pump system.

2. The extinguishing system according to claim 1, wherein the extinguishing controller is configured to determine an output of the extinguishing system.

3. The extinguishing system according to claim 2, further comprising:

a pressure sensor for the pump system, the pressure sensor being configured to measure an operating pressure at an exit of the pump system; and/or a flow meter for the pump system, the flow meter being configured to measure a flow at the exit of the pump system.

4. The extinguishing system according to claim 3, further comprising:

a pressure sensor for one of the one or more nozzles for measuring an operating pressure at the one of the one or more nozzles; and/or a flow meter for one of the one or more nozzles for measuring a flow at the one of the one or more nozzles;

wherein the extinguishing system is a displaceable extinguishing system.

5. The extinguishing system according to claim 4, wherein:

the pressure sensor and/or the flow meter for the one of the one or more nozzles are operatively connected to the extinguishing controller; and the extinguishing controller is configured to update the control of the pump system based on measurement data.

6. The extinguishing system according to claim 5, wherein the extinguishing controller is configured to at least partially compensate for dynamic effects of the one or more extinguishing conduits.

7. The extinguishing system according to claim 1, further comprising:

a pressure sensor for the pump system, the pressure sensor being configured to measure an operating pressure at an exit of the pump system; and/or a flow meter for the pump system, the flow meter being configured to measure a flow at the exit of the pump system.

8. The extinguishing system according to claim 7, wherein:

the pressure sensor and/or the flow meter are operatively connected to the extinguishing controller; and the extinguishing controller is configured to update control of the pump system based on measurement data obtained from said pressure sensor and/or said flow meter.

9. The extinguishing system according to claim 7, further comprising:

a pressure sensor for one of the one or more nozzles for measuring an operating pressure at the one of the one or more nozzles; and/or a flow meter for one of the one or more nozzles for measuring a flow at the one of the one or more nozzles.

10. The extinguishing system according to claim 1, further comprising:

a pressure sensor for one of the one or more nozzles for measuring an operating pressure at the one of the one or more nozzles; and/or a flow meter for one of the one or more nozzles for measuring a flow at the one of the one or more nozzles.

11. The extinguishing system according to claim 1, wherein the extinguishing controller is configured to at least partially compensate for dynamic effects of the one or more extinguishing conduits.

12. The extinguishing system according to claim 1, wherein the one or more nozzles is at least two nozzles.

13. The extinguishing system according to claim 1, further comprising an operating means configured to increase or reduce the operating pressure.

14. The extinguishing system according to claim 1, wherein the input system comprises a mobile application.

15. The extinguishing system according to claim 1, wherein the input system comprises a database, and wherein the data about the one or more extinguishing conduits is obtained from the database in response to the user providing a type of the one or more extinguishing conduits.

16. The extinguishing system according to claim 1, wherein the extinguishing controller comprises a nozzle control configured to turn one of the one or more nozzles on or off.

17. The extinguishing system according to claim 1, wherein the extinguishing system is a displaceable extinguishing system.

18. A method for extinguishing fires, the method comprising steps of:

providing an extinguishing system for extinguishing fires, the extinguishing system comprising:

a pump system for pumping an extinguishing agent;

one or more nozzles connected operatively to the pump system for spraying the extinguishing agent at a source of fire;

a supply or inlet arranged on the pump system for supplying the extinguishing agent to the pump system;

one or more extinguishing conduits with respective extinguishing lengths arranged on the pump system for supplying the extinguishing agent to the one or more nozzles; and an extinguishing controller provided with an input system that provides system data supplied by a user, wherein the system data comprises data about the one or more extinguishing conduits, data about the pump system, and data about the one or more nozzles, the data about the one or more extinguishing conduits comprising:

a quantity of the one or more extinguishing conduits; and a length and/or diameter of each of the one or more extinguishing conduits;

the extinguishing controller further comprising a feedforward component configured to determine an operating pressure on the basis of the system data obtained by the input system;

installing the extinguishing system;

activating the extinguishing system, comprising supplying the system data to the input system, including data about the extinguishing conduit, the pump system, and the one or more nozzles; and determining, using the feedforward component of the extinguishing controller, an operating pressure at the one or more nozzles based on the system data to control the pump system.

19. The method according to claim 18, further comprising correcting the control of the pump system when one of the one or more nozzles is shut off or adjusted.

20. The method according to claim 18, further comprising correcting the control of the pump system based on measurements performed by one or more pressure sensors and/or flow meters.

* * * * *